United States Patent [19]

Cilderman et al.

[11] 4,198,196
[45] Apr. 15, 1980

[54] APPARATUS FOR SPLICING ENDS OF A GROOVED SHEAVE INSERT MEMBER

[75] Inventors: Janis J. Cilderman, W. Simsbury, Conn.; Joseph G. Kirincich, Saddle River, N.J.

[73] Assignee: Otis Elevator Company, New York, N.Y.

[21] Appl. No.: 30,986

[22] Filed: Apr. 17, 1979

[51] Int. Cl.² .................. B29C 1/14; B29C 27/00; B29H 7/22
[52] U.S. Cl. .................................. 425/123; 156/502; 249/78; 249/83; 249/87; 249/95; 425/125; 425/127; 425/343; 425/400
[58] Field of Search .............. 156/137, 138, 159, 157, 156/304, 500, 502; 425/28 B, 28 D, 34 B, 384, 383, 40, 47, 110, 116, 117, 128, 127, 123, 125, 343, 400; 249/78, 87, 95

[56] References Cited

U.S. PATENT DOCUMENTS

| | | | |
|---|---|---|---|
| 1,362,604 | 12/1920 | Czaran | 156/502 |
| 2,069,362 | 2/1937 | Ford | 156/502 |
| 2,434,361 | 3/1948 | Doblin et al. | 156/502 |
| 2,718,255 | 9/1955 | Levin | 156/502 |
| 3,400,630 | 9/1968 | Burger | 156/304 |
| 3,767,512 | 10/1973 | Tsuda | 156/502 |
| 4,152,190 | 5/1979 | Kurosawa | 156/502 |

FOREIGN PATENT DOCUMENTS 1037110  7/1966  United Kingdom ............... 156/159

*Primary Examiner*—W. E. Hoag
*Attorney, Agent, or Firm*—Robert E. Greenstien

[57] ABSTRACT

Apparatus for splicing ends of a sheave insert material in which the ends of a premeasured length of an elastic, thermoset sheave insert material are laminated together in a special splicing jig for fabricating a unitized insert loop, which is subsequently stretched around a sheave into a preformed insert receiving slot along the circumference thereof. The jig holds the ends of the premeasured length of insert material in alignment as a heated mold, included therein, fits snugly around the ends and applies heat to the joint therebetween, into which the insert material, in liquid form, has been inserted to join the ends. The heat thus applied to the joint accelerates the curing of the liquid into the same consistency as the insert; thereby producing a unitized bond between the ends by which the unitized loop is thus formed.

4 Claims, 4 Drawing Figures

APPARATUS FOR SPLICING ENDS OF A GROOVED SHEAVE INSERT MEMBER

BACKGROUND OF THE INVENTION

This invention relates to elevator systems and specifically to methods and apparatus for fabricating and installing thermoset plastic inserts in the metal drive sheaves frequently used in such systems.

In the typical elevator system, multistrand steel ropes or cables ride on large metal drive sheaves that are rotated by an electric motor to raise and lower the car. The car is attached to a counterweight by the ropes and the car and counterweight hang from opposite sides of the sheaves. Thus, the counterweight balances against the weight of the car, and reduces the lifting force. The counterweight and car move in opposite directions in the shaft: as the car goes up the counterweight goes down and vice versa. The sheaves thus support the combined weight of the car, the load and the counterweight, or roughly twice the loaded car weight.

The ropes typically rest in slots in the rim of the sheave. The depth of these slots, in many cases, is greater than the diameter of the rope; the rope thus does not rest on the bottom of the slot, and, as a result, it is squeezed between the walls of the slot by the downward pull from the car and counterweight. This aids in providing good traction between the sheave and the rope to minimize rope slippage as the sheaves are rotated.

Sometimes the thin wire strands that make up the ropes are woven in a direction at right angles normal to the direction of rope and sheave movement to improve traction; this is commonly known as a Lang lay.

Consequently, as the rope passes around a rotating sheave, it is repeatedly squeezed and released as it passes in and out of the slot. This may produce accelerated rope wear, especially along the rope edge as it repeatedly rubs or scrapes on the slot walls. It may also cause the rope to flatten slightly (to change from its normal generally round shape to the shape of the slot). These adverse effects are particularly prevalent in insertless sheaves, and may produce unacceptable rope slippage on the sheave, especially as the slot wears. In a typical installation the only way to correct this is by complete sheave and/or rope replacement, which can be expensive and time consuming, especially in large buildings, where the ropes are very long. Thus, minimizing rope wear translates directly into increased service life, reduced operating costs and increased reliability.

A successful technique utilized in the prior art to minimize the occurrence of these adverse effects, and also at the same time reduce noise and vibration transmission and increase rope traction at the same time, is to place a thermoset plastic insert into the lower portion of the slot. The rope rests on the insert, which provides a high traction, soft, load bearing surface that prevents the rope from being pulled into the lower portion of the slot, where it may be undesirably squeezed or compressed. Such inserts are disclosed in U.S. Pat. No. 3,279,762, which is commonly owned herewith. Such inserts can significantly extend rope life, and, of equal importance the traction relationship between the sheave and the rope is not determined, to any significant degree, by the extent to which the rope is squeezed between the slot walls. Inserts therefore serve to reduce the otherwise critical relationship between rope size and slot dimensions for good traction. To enhance these features, inserts frequently have traction cleats oriented normal to the direction of shaft rotation, as disclosed in the aforementioned patent.

The inserts typically are constructed of molded thermoset plastic, such as polyurethane, which is particularly desirable as it has high durablity and inherent elasticity. The inserts may be installed in short segments around the sheave, or preferably as a continuous, closed loop, which may be installed like a tire is on a rim: by stretching it around the outer edge of the sheave and working it into the slot. Because it has inherent elasticity, a polyurethane insert loop will be pulled or drawn into the slot if its overall circumference is slightly less than the circumference of the sheave, as measured in the groove into which the insert is placed; thus the insert is desirably tensioned (stretched) in the slot, preventing its movement therein.

A thermoset insert, i.e. one constructed of polyurethane, with cleats, is fabricated by molding liquid polyurethane material and curing it under temperature. Such an insert may be joined into a homogeneous loop of insert by joining the ends together; this may be accomplished by placing additional liquid polyurethane between the ends, holding them in place while the liquid cures and applying heat to accelerate curing. The maximum temperature must be controlled, however, because excessive heat can cause damage to the insert material. Moreover once a thermoset plastic material has cured, it generally may not be remolded simply by heating. In some instances heating may even impair the material's flexibility and durability. Other plastics (i.e. styrene) are not as adversely effected by heat: they can be remolded. But their durability, especially under frictional loading, is not nearly as good as thermoset plastics. Consequently, laminating or adhesively bonding the ends of thermoset inserts (i.e. polyurethane) must be done with sufficiently good heat control.

In many multisheave installations, the sheaves are mounted on a single shaft supported at each of its ends by a large bearing stand that is bolted to the floor of the elevator machine room. These bearings sustain the aggregate weight of the elevator car and counterweight. Installation of "looped" inserts in such arrangements requires disassembly of at least one bearing stand so that the loop may be passed around the shaft and worked into place on the sheave. This applies to both insert replacements and retrofits for sheaves without any inserts.

Consequently, installation of a homogeneous or looped insert may be expensive and time consuming. The need to block the car and completely slacken all the ropes, when this is done, further adds to the cost, and even if only one insert is to be installed, that procedure must be followed, since the stand has to be completely disassembled on one end; that can only be done by releaving the load on every sheave. In contrast, if the stand does not have to be disassembled, only the cable on the sheave being serviced has to be slackened. Since heretofore the replacement loops could be made only in a factory, complete disassembly of the stand was required.

SUMMARY OF THE INVENTION

Objects of the present invention include providing an apparatus for fabricating homogeneous or unitized thermoset inserts for use in elevator drive sheaves.

According to the present invention, a premeasured length of factory molded thermoset insert material is joined into a unitized loop by placing its ends in a specially adapted splicing jig. The ends of the insert are held together in alignment in the jig by alignment posts and guides that register with the molded cleats in the insert. The thermoset material is applied, in liquid form, to the space between the ends. The jig includes a combination heater and mold, which fits over the joint to apply heat thereto and simultaneously properly mold the liquid to the insert shape as it cures in the joint and simultaneously hold the ends steady.

A feature of the invention is that the jig according thereto permits fabrication of one or more loops within the immediate area of the sheave, which is possible because the jig can be small and portable; similarly, it can be adapted to accommodate several inserts at the same time. Thus, there is no need to disassemble a bearing stand in those installations in which such stands are used; moreover, several loops can be fabricated simultaneously.

Other objects, benefits, and features of the invention may be apparent to one skilled in the art from the detailed description and claims that follow and the drawing, wherein:

DETAILED DESCRIPTION

Figure 1:
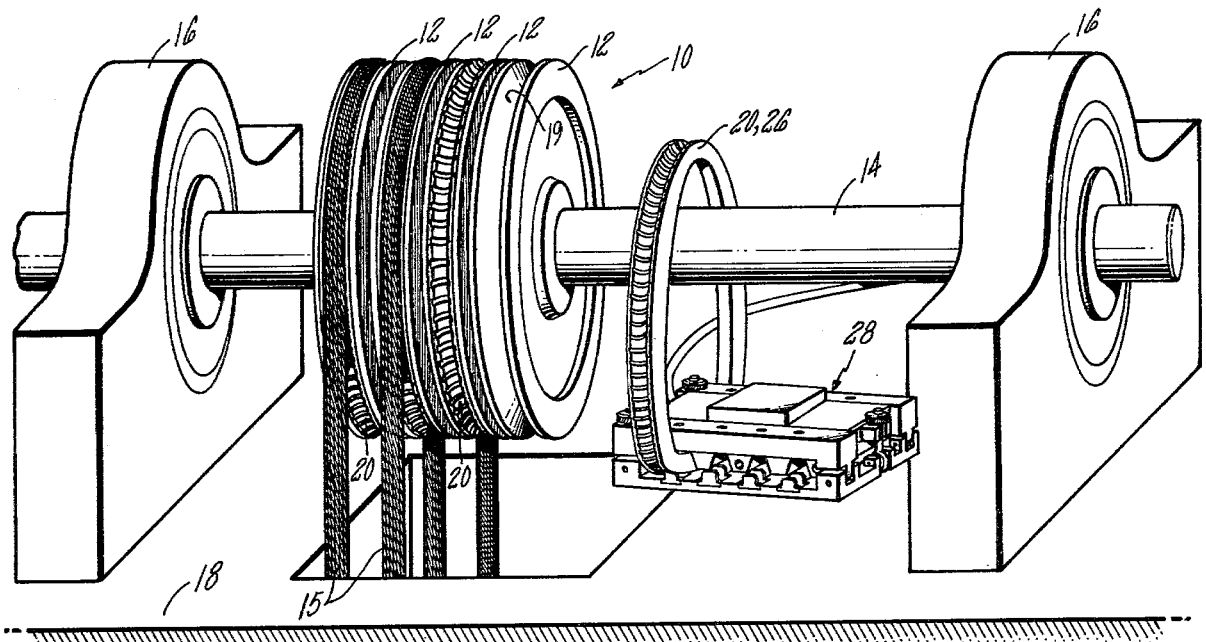
FIG. 1 is a perspective view illustrating a typical elevator sheave assembly found in the prior art and a length of insert being fabricated around a supporting shaft therein, according to the teachings of the instant invention.

FIG. 1 shows a typical elevator sheave arrangement 10 frequently utilized in the prior art. A plurality of large diameter metal sheaves 12 are mounted on a single shaft 14; the shaft is supported at each end on a bearing stand 16 and the stand is fixed on the floor 18 of the elevator machine room. A plurality of steel ropes 15 are connected around the sheaves to an elevator car and counterweight, which are not shown specifically. An electric motor (also not shown) is powered to rotate the shaft to raise and lower the car. Thus, the moving force is transmitted to the rope through the sheaves. The sheaves support the combined weight of the car and the counterweight. Ideally the counterweight balances the weight of the car and part of the load, so that, any force required to raise and lower the car is the force necessary to accelerate and to overcome frictional losses in the system, which forces may be very significant in view of the weight supported by the cables.

Figure 2:
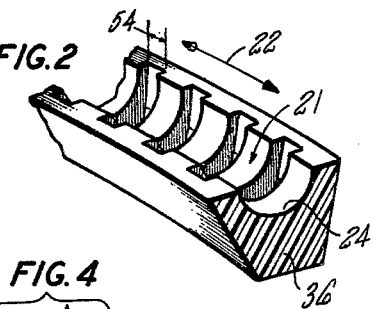
FIG. 2 is a perspective view illustrating a short segment of sheave insert material which includes a rope receiving groove extending the length thereof and traction cleats normal to said groove.

Each sheave 12 includes a V-shaped slot 19 which receives a homogeneous or closed loop 20 of thermoset plastic insert material. As shown in FIG. 2, the insert is also V-shaped to fit into the slot 19 and includes a plurality of traction cleats 21 that are normal to the direction of sheave and cable movement 22. These cleats also have a circular seat 24 shaped to receive the cable snugly, as shown in FIG. 1.

The premeasured length of insert 26 is wrapped around the shaft and its ends are disposed in a special, handheld, splicing jig 28, which is portable and small enough to fit into the immediate area of the sheaves, as illustrated in FIG. 1.

Figure 4:
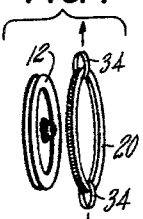
FIG. 4 is an elevational view illustrating a preferred manner for installing a unitized sheave insert loop on a typical large metal sheave found in the prior art.

Through the use of this jig, the ends 30, 32 (FIG. 3) of the premeasured length of insert 26 are joined for producing the homogeneous or unitized loop of insert 20, shown installed in the other sheaves 12 in FIG. 1. Once the loop is formed or fabricated it may be stretched or worked into the slot preferably in the manner illustrated in FIG. 4; there filament tape 34 is looped around the insert 20, 26 for stretching it apart around the sheave. The tape is thin and thus can fit into the slot along with the insert. By simply cutting it and pulling it out by one end, the tape is easily removed after the insert is in place in the slot. Other techniques, possibly more closely akin to those used for placing a tire on a rim, may also be used. For purposes of attaining a strong bond between the ends 30, 32, the insert should be cut through the cleat wall 36, as this will allow for the maximum possible bonding area.

Figure 3:
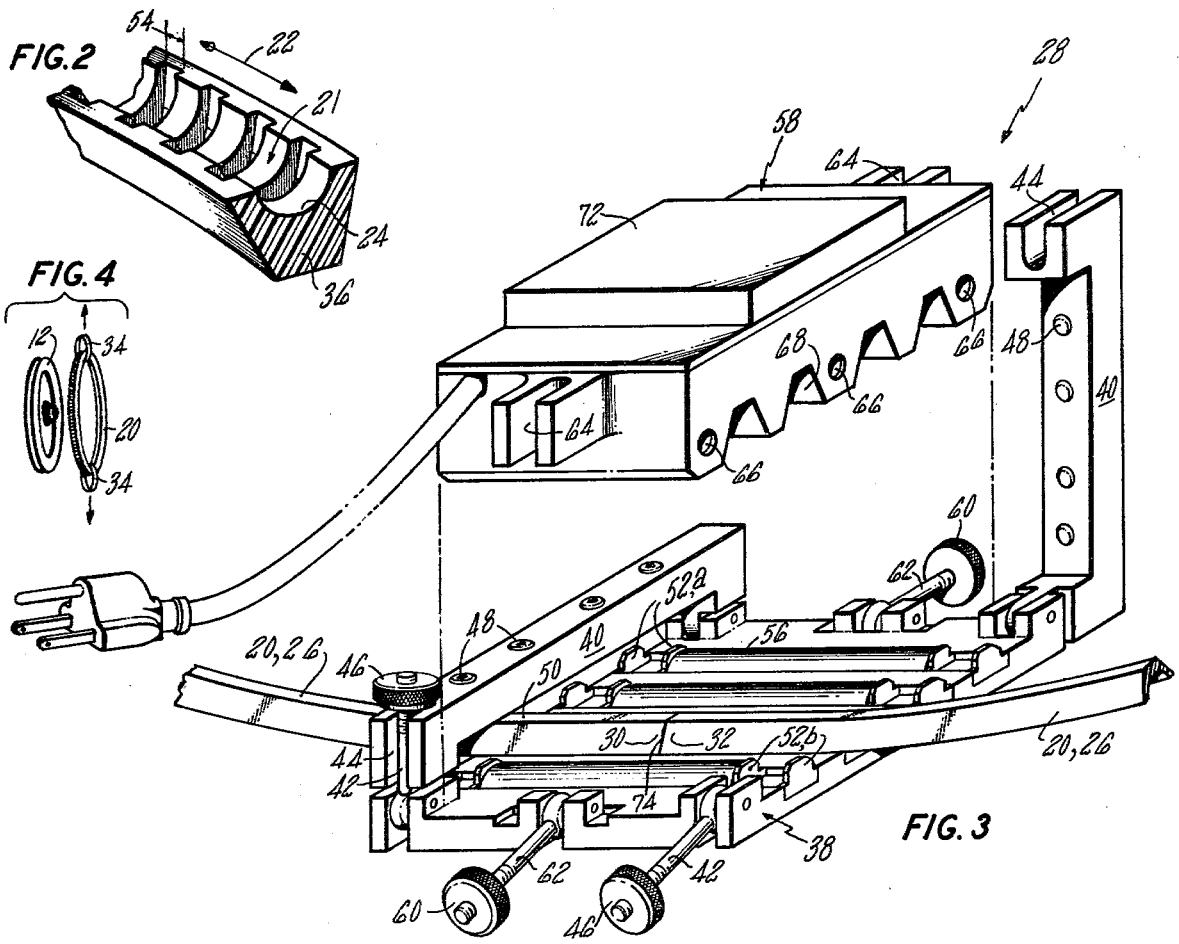
FIG. 3 is a perspective view illustrating a splicing jig according to the teachings of the present invention.

FIG. 3 illustrates the splicing jig 28 with the single premeasured length 26 of insert installed therein for its fabrication into loop in accordance with the present invention, although three more such loops may be fabricated in the embodiment shown by the same procedure used for a single loop, as hereinafter described for exemplary purposes, which may be accomplished, as shown in FIG. 1, around the shaft (in the machine room), if needed. The jig includes a base plate 38 and two identical hinged clampdown bars 40 for holding the insert ends 30, 32 in place thereon. As shown by the left-hand bar 40, which is holding down the end 30, a hinged lug bolt 42 fits into a slot 44 in each bar, and a knurled nut 46 is tightened down on the lug bolt for applying holddown force to the insert ends. Each bar includes a screw 48 for each insert end. Each screw is turned in to contact the base 50 of the insert for positioning the insert and for applying the hold-down force to the ends after the bar is tightened down. With the screws 48 loosened and the bar tightened down, the ends may be inserted between the bar and base plate; the screws may then tighten to hold the ends in place. The screws 48 are adjusted so that adequate, but not excessive force, is applied to the end.

It will be noted that each end is pushed down on to two alignment posts 52. The thickness of each post is essentially equal to the width of the space 54 between the traction cleats into which each post enters. The posts are arranged in pairs (i.e. pairs a and b) on opposite sides of the base. An elevated guide 56 extends between the inner posts of each pair. This guide is shaped to fit snugly into the seat 24 (FIG. 2) defined in the cleats 36. The distance between the pairs should be such that the ends touch and lie uniformly on top of the guide with the posts in the space 54 between the cleats 36.

The jig further includes a thermostatically controlled heater, for heating the inserts, which is clamped down onto the base by tightening a knurled nut 60 on each of the hinge bolts 62 on opposite sides of the base, once the bolts are positioned in slots 64 in the heater. The heater contains heating elements 66, such as resistors, which extend transversely thereacross in the interior thereof. These elements are adjacent V-shaped slots 68, also extending thereacross, which register with the insert back when the heater is tightened down in the aforementioned manner. The portion of the heater containing the slots is constructed of high thermoconductivity material, i.e. aluminum. A thermostat 72 regulates power to the elements in order to control the maximum temperature of the heater.

Assuming the insert 26 is molded of polyurethane plastic, to bond its ends 30, 32 together, liquid polyurethane is applied to the joint 74 after the ends are clamped down on the base plate. Application of the liquid is best accomplished by lifting the ends slightly, applying the liquid, and then pushing the ends down onto the guide. The heater 58 may then be tightened down on the base, with the ends 30, 32 fitting into the slots 68; once in place the heater may be activated by plugging it into a conventional wall socket.

As the liquid polyurethane cures under the heat thus applied, it solidifies into the same elastic material form as the balance of the insert. The resultant joint structure is no different from the other portions of the insert; thus, its durability and flexibility of the joint is the same. Hence, this may be viewed as a laminating process, much like vulcanization of rubber, in that the resultant joint is homogeneous with the contiguous material. Therefore, the fabricated loop is effectively a single unitized or homogeneous loop of insert material, which may be stretched into place around the sheave, possibly in the aforedescribed manner illustrated in FIG. 4, once the curing process is completed and the jig is disassembled in reverse order.

It will be noted from FIG. 1 that although the fabrication of one loop has been described, the exemplary model of the jig suggests simultaneous fabrication of four such loops. Naturally, the jig's capacity can be increased or decreased according to specific needs. When replacing inserts, the old or worn inserts are cut on the sheave and removed.

Although the invention has been shown and described with respect to exemplary embodiments thereof it should be understood by those skilled in the art that the foregoing and various other changes, omissions and additions in the form and detail thereof may be made therein and thereto without departing from the spirit and scope of the invention hereinafter claimed.

We claim:

1. An apparatus for use in joining the ends of a length of sheave insert by curing material therebetween, the insert having a groove extending the length thereof, comprising:

a base containing an elevated guide thereon for receiving the ends, said guide being adapted to fit congruently into said groove and being substantially straight so that the ends are colinear when disposed thereon, and a heated mold removably mounted on said base and containing a slot which fits congruently around the ends when said mold on said base, for applying heat to the material being cured and molding it to the shape of the insert.

2. An apparatus according to claim 1, for use in joining inserts containing spaced apart cleats that are normal to the groove, further comprising:

a plurality of alignment posts extending upward from said guide, colinear therewith, for registering with said cleats for restraining the ends on said guide when disposed thereon for holding the ends together.

3. An apparatus, according to claims 1 or 2, further comprising:

means located on said base for adjustably forcing the ends against said guide.

4. An apparatus according to claim 3, wherein:

said mold includes a slot for receiving said ends, said slot being congruent with said ends and including at least one electrically powered heating element contiguous therewith.

* * * * *